H. N. TUCKER.
Cake-Cooler.

No. 219,835. Patented Sept. 23, 1879.

Witnesses:
Sarah B. Jacobs
C. R. Tucker

Inventor:
Horace N. Tucker

UNITED STATES PATENT OFFICE.

HORACE N. TUCKER, OF STOUGHTON, MASSACHUSETTS.

IMPROVEMENT IN CAKE-COOLERS.

Specification forming part of Letters Patent No. 219,835, dated September 23, 1879; application filed April 19, 1879.

*To all whom it may concern:*

Be it known that I, HORACE N. TUCKER, of Stoughton, in the county of Norfolk and State of Massachusetts, have invented a new and useful Improvement in Cake-Coolers, of which the following is a specification.

Figure 1:
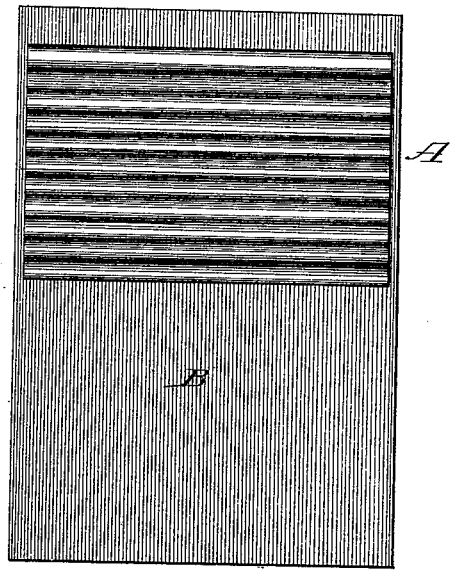
Figure 2:
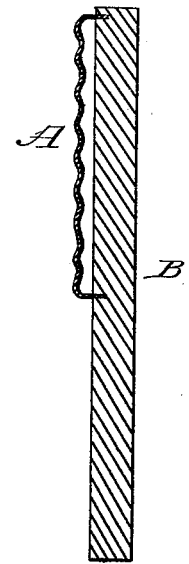

Figure 1 is a plan view of my improved utensil, showing its form, corrugated surface, and application to the cake board or shelf.

I make this utensil of tin or other thin metal by pressing between corrugated dies, and attach the same to cake board or shelf by pressing into slots or otherwise.

The advantages of my improvement consist in the fact that it can be made and sold much cheaper than any other known device used for the same purpose—i. e., allowing a current of air to pass under the loaf when removed from the oven, thereby preventing the under side from sweating and the upper from falling—results desired and striven for by all efficient cooks.

Another advantage consists in its being more easily washed or cleaned than the common coolers made of woven wire attached to frames.

Having thus described my invention and its advantages, what I claim as new, and desire to secure by Letters Patent, is—

1. The combination of the corrugated plate A, whether of wood, clay, or metal, with the board or shelf B, substantially as shown and described.

2. The combination of the corrugated plate A with the folded or bound edges of the same, when made and used for the purposes herein set forth.

HORACE N. TUCKER.

Witnesses:
SARAH B. JACOBS,
C. R. TUCKER.